A. FOUBERT.
Making Vinegar.
No. 63,031              Patented Mar. 19, 1867.
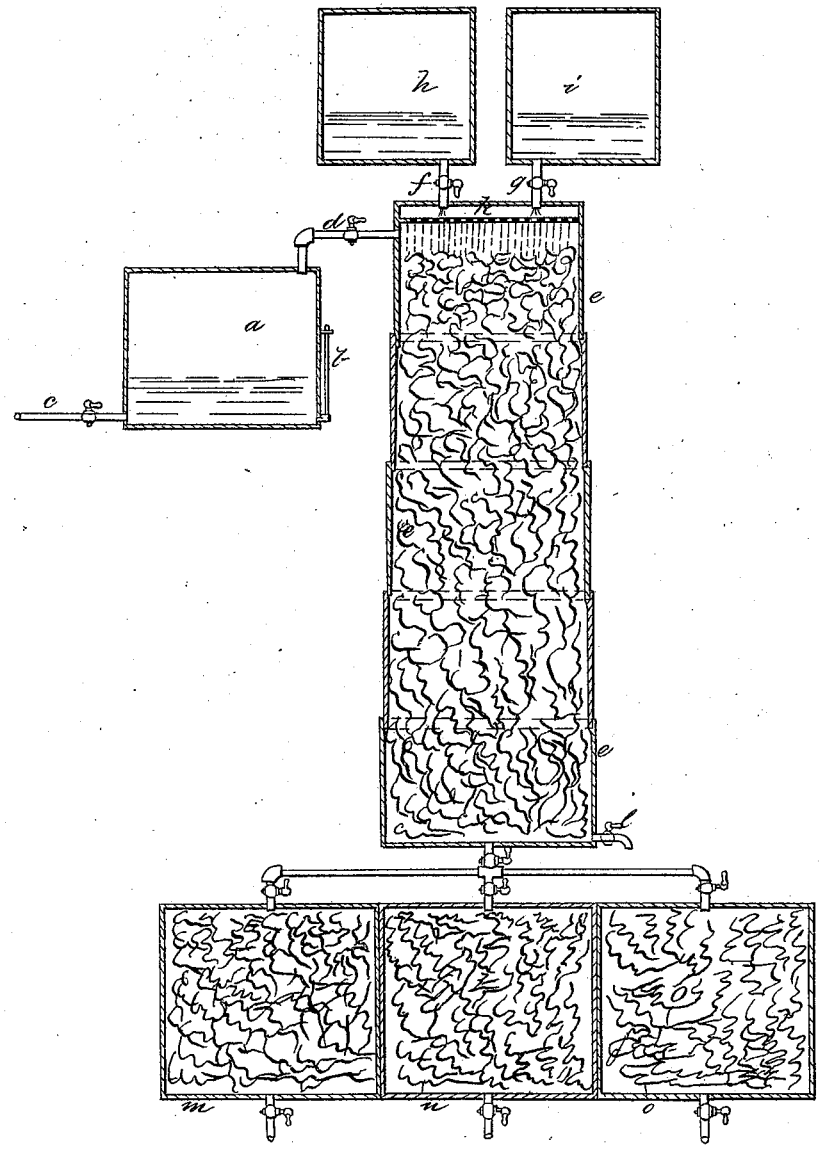

United States Patent Office.

ANDRÉ FOUBERT, OF NEW YORK, N. Y.

Letters Patent No. 63,031, dated March 19, 1867.

IMPROVEMENT IN APPARATUS FOR THE MANUFACTURE OF VINEGAR.

The Schedule referred to in these Letters Patent and making part of the same.

TO ALL WHOM IT MAY CONCERN:

Be it known that I, ANDRÉ FOUBERT, of the city and State of New York, have invented and made a certain new and useful Improvement in Apparatus for the Manufacture of Vinegar; and I do hereby declare the following to be a full, clear, and exact description of the said invention, reference being had to the annexed drawing, making part of this specification, wherein I have represented a vertical section of my apparatus employed in the manufacture of vinegar.

It is well known that vinegar made from wines, particularly those formed by the vinous fermentations of grain, is of a superior quality, but it is not clear and of a good color. The vinegar made in this manner has been treated in various ways for its clarification, but these modes are costly, and sometimes difficult.

The nature of my said invention consists in evaporating light or grain wines and condensing the same, and allowing the liquid to trickle over shavings or similar substances for the same to become acidified and converted into a superior quality of vinegar.

In the drawing, $a$ is a vessel supplied with wine; $b$ is a glass gauge by which the height is observed; $c$ is a pipe supplying steam to the vessel $a$, for heating the same. The steam may be within a coil or allowed to blow out into the wine through small holes in the pipe. $d$ is a pipe leading to the upper part of the acetifying vessels $e$ $e$. These vessels, $e$ $e$, are formed in the usual manner, for receiving shavings or similar materials, and openings for the admission of air to oxidize the liquid in forming the vinegar.

The upper part of the vessels $e$ is provided with a perforated diaphragm, $k$, and $f$ and $g$ are cocks and pipes from the vinegar vessel $h$ and water vessel $i$, leading into the space above the diaphragm $k$.

The apparatus is used as follows: The vessel $a$ is heated up until the vapors of the wine begin to pass over freely; this may be determined by the hand applied to the pipe $d$. The cocks $f$ and $g$ are then turned so as to admit a proper and regulated amount of water and vinegar to flow over the diaphragm $k$, and fall in a shower, condensing the vapors from $a$; and the liquid commingling and trickling over the shavings or loose material in the presence of the atmosphere is acidified and can be drawn away by the cock at $l$.

If the vinegar is not sufficiently acidified, it may be run into either of the vessels $m$, $n$, or $o$, by the pipes and cocks provided for that purpose, as shown.

The water and vinegar may be mixed together instead of being contained in separate vessels, or water alone may be used to condense the vapors of the wine.

What I claim, and desire to secure by Letters Patent, is—

The manufacture of vinegar from the vapors of wine, condensed and acidified in substantially the manner specified.

In witness whereof I have hereunto set my signature this twenty-second day of January, A. D. 1867.

ANDRÉ FOUBERT.

Witnesses:
 LEMUEL W. SERRELL,
 CHAS. H. SMITH.